Oct. 3, 1967   R. E. ROBERSON   3,345,083
POWER DRIVEN VERTICALLY ADJUSTABLE TRACTOR HITCHES
Original Filed Sept. 27, 1962   3 Sheets-Sheet 1

INVENTOR.
Robert E. Roberson,
BY
Atty.

INVENTOR
Robert E. Roberson,
BY
Atty.

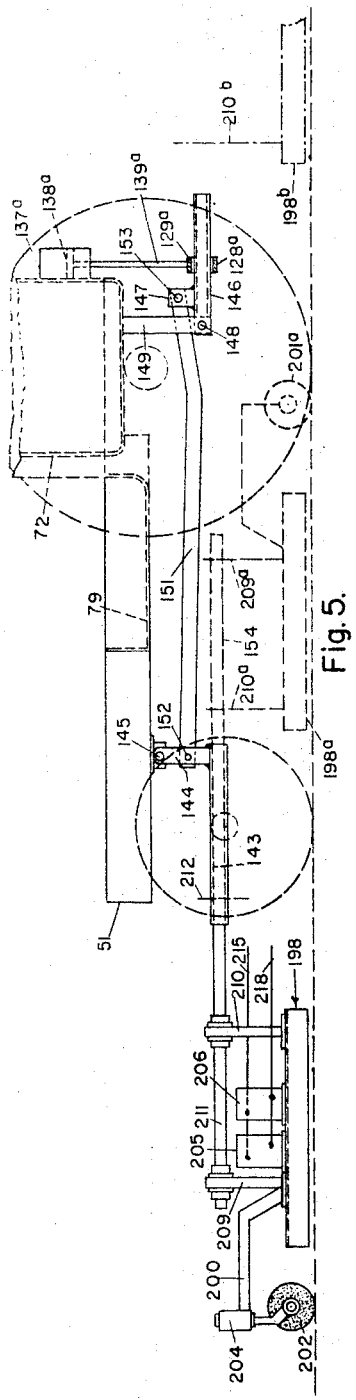

250
United States Patent Office 3,345,083
Patented Oct. 3, 1967

3,345,083
POWER DRIVEN VERTICALLY ADJUSTABLE TRACTOR HITCHES
Robert E. Roberson, 3520 Landwehr Ave., Northbrook, Ill. 60062
Original application Sept. 27, 1962, Ser. No. 227,125, now Patent No. 3,250,340, dated May 10, 1966. Divided and this application May 6, 1966, Ser. No. 548,084
8 Claims. (Cl. 280—490)

ABSTRACT OF THE DISCLOSURE

A hitch for power driven tractors, including longitudinally extending traction elements beneath the tractor body, and pivotally connected to such body by an axis extending transversely of the tractor body, and which axis is located between the plane of the bottom of the tractor, and the horizontal plane which includes such traction element; with power means to raise or lower the rear end of such traction elements.

---

This invention relates to improvements in motor driven implements, and the like. This application is a division of my co-pending application for patent on improvements in hydrostatic driving system for motor vehicle, Ser. No. 227,125, filed Sept. 27, 1962, Letters Patent of the United States, No. 3,250,340, issued May 10, 1966.

In that parent application I have fully disclosed a motor driven vehicle structure, wherein the drive of the vehicle is effected by use of hydrostatic motors, actuated by high pressure liquid supplied by motor driven pumping means carried by the vehicle, and controlled by the driver. Such operations include the carriage of a body of the liquid in a tank of considerable size, from which the liquid is drawn by the pumping unit, and is delivered by such pumping unit under high pressure (upwards of 2500 p.s.i.) to the vehicle drive motors under control of the vehicle driver. Provision is made, when the pumping and drive motor units are of size sufficient to meet all expected conditions of vehicle traction and speed, with excess pumping capacity and motor power capacity, to supply such high pressure liquid, or liquid of reduced pressure, for the operation of implements attached to or used in connection with such vehicle, in addition to producing the drive of the vehicle itself, with such attached implements. Under such implement supply operation, provision must be made for supply of the pressure liquid (either at its full pump delivered pressure, or at some partial pressure) to such attached implement, for drive of its power driven elements, and for return of the low pressure liquid from such implement, to the liquid circulating system of the vehicle, for supply to the pump, and for re-pressurizing by such pump, as a portion of the liquid supply and circulation system.

In such parent application I have disclosed arrangements for meeting the conditions imposed when such an implement or implements is or are attached to and used for their intended purposes, during the normal travel operations of the vehicle, or when the vehicle is standing still. Such provisions, include branch liquid pressure supply connections in the vehicle system, and also branch liquid return connections in the vehicle system, to which vehicle branch connections the pressure liquid supply and delivery elements of the implement may be readily detachably connected, without use of special tools for such operations.

I have herein disclosed such implements in the form of a snow-thrower, constituted for attachment to the hitch of the vehicle itself, a scraper, also constituted for attachment to the vehicle hitch, a lawn-mower, also constituted for attachment to the vehicle hitch; and I have also disclosed two novel forms of the vehicle hitch to which such implements, or other implements may be readily connected, each such implement, being itself provided with one or more power driven elements, constituted for such power drive by pressure liquid, and return liquid connections, to the take-off elements of the vehicle itself.

I have herein disclosed hitch units carried by the motor vehicle and adapted to transmit traction to connected implements located either in front of the tractor, or behind or beneath the body of the vehicle. I have disclosed two forms of such hitches, and I have provided pressure liquid operated means such as a cylinder by which the hitch unit may be manipulated to produce desired functions related to the operations of the implement which is connected to the hitch. Such power means thus comprises means to adjust the operating conditions of the implement, as for example, adjusting the downward pressure being exerted on the implement (e.g., a plowscraper) or, conversely, reducing such downward pressure as desired. Additionally, in the case of certain of the herein disclosed implements, which require power for their operation, provision is made for attachment of the power operated elements of such implements, to the liquid pressure and release lines of the vehicle itself. Thus, in the case of the snow-thrower implement herein disclosed, the snow-throwing blades may be driven by pressure liquid derived from the vehicle, and pressure liquid derived from the vehicle may also be used for shifting the snow-thrower hood into either of two positions, for delivery of the snow to either one side of the road-way or the other, with concurrent reversal of the rotational direction of the rotary blade snow-throwing element.

The herein disclosed lawn-mower unit, it provided with liquid driven cutters with their blades rotating in horizontal planes or plane, with provision for supplying the liquid driven motors for such blades, from the pressure liquid system of the vehicle, and return of the released liquid to the liquid system of the vehicle. In this case, the closeness at which the grass will be cut, will depend on the elevation at which the lawn mower blades are supported above the ground surface. The hitch structures are such that such elevation of the implement may be adjusted by the power unit which is connected to the hitch. By reason of the provision of power means to adjust the elevation of the mower supported end of the hitch, and power driven blade cutters, it is possible to power adjust all of the operational conditions of the mower during the cutting operation.

The scraper unit herein disclosed is also provided with pressure liquid operated means to rock the blade about a vertical axis located more or less centrally of the front to back central axis of the vehicle. Such pressure liquid operated rocking means also derives its pressure liquid supply from the power liquid system of the vehicle, and returns the released liquid to the vehicle.

Other objects and uses of the invention will appear from a detailed description of the same, which consists in the features of construction and combinations of parts hereinafter described and claimed.

Figure 1:
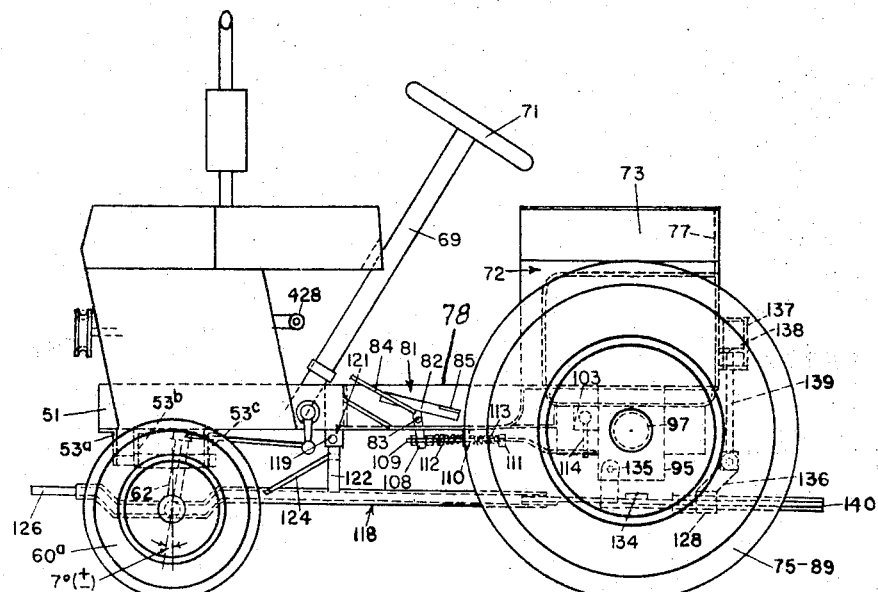
FIGURE 1 shows a side elevation of a motor vehicle provided with one form of hitch embodying features of my present invention, such hitch extending slightly forward of the front end of the vehicle, and slightly rearward of the rear end of the vehicle; the hitch being shown in a free condition, such as it normally occupies when not in use.
Figure 2:
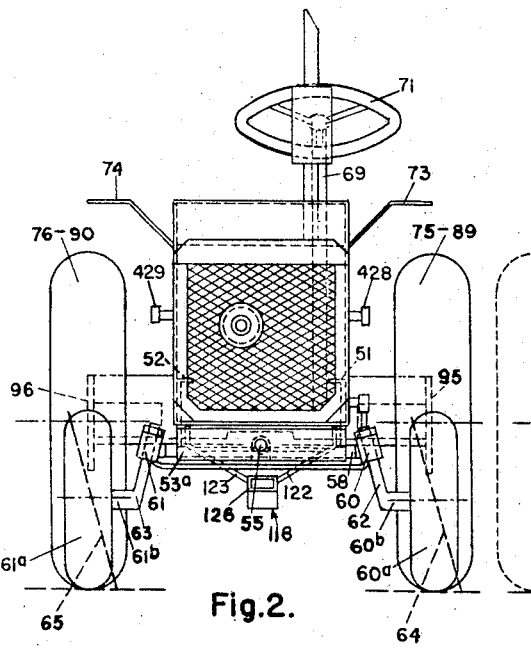
FIGURE 2 shows a front end view corresponding to FIGURE 1; the front end of the hitch bar being shown as a rectangular open tube element, to receive the pull bar of an implement.
Figure 3:
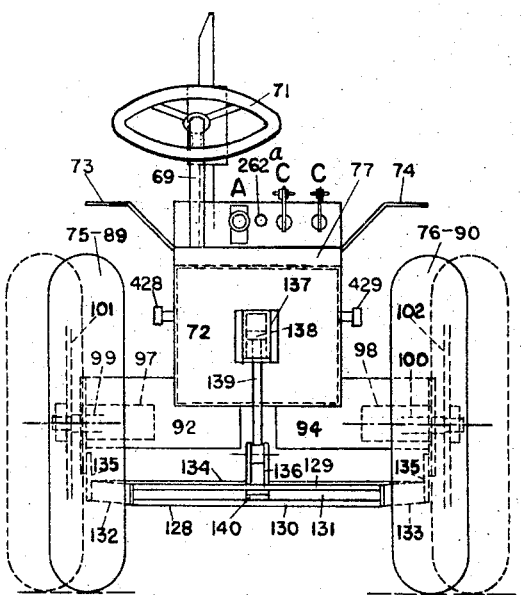
Figure 4:
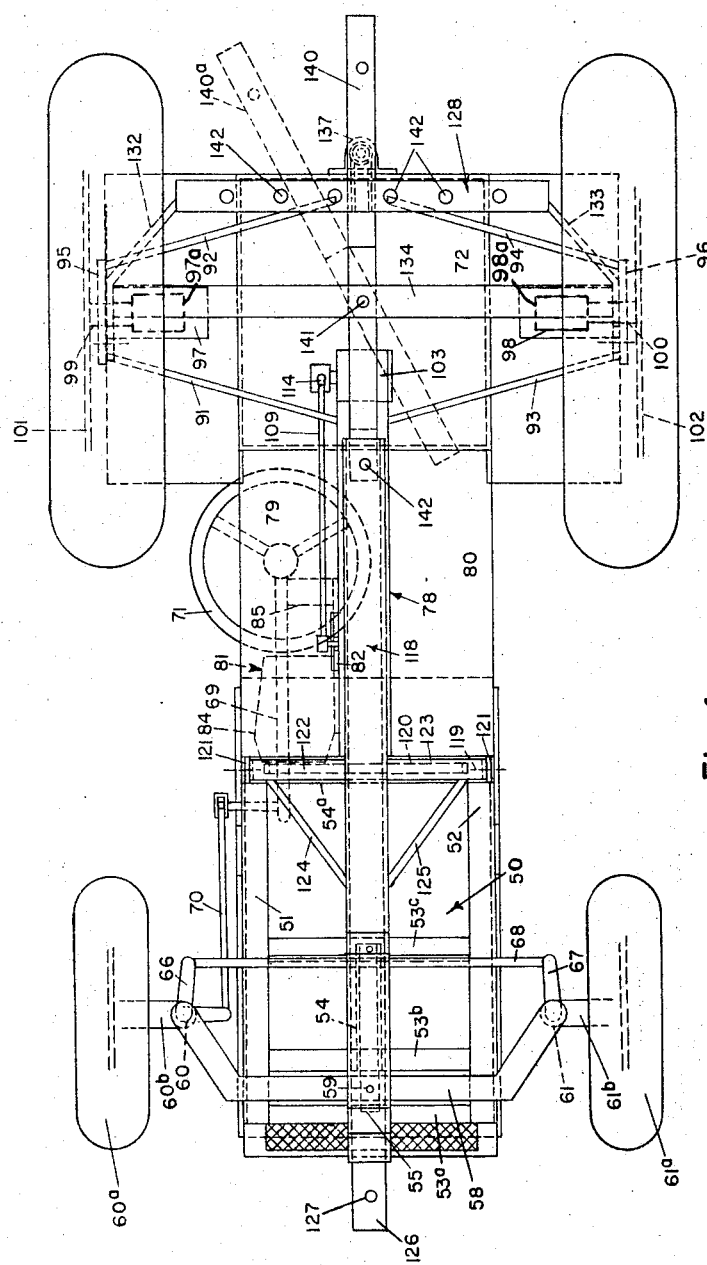

FIGURE 3 shows a rear end view corresponding to FIGURES 1 and 2; the hitch rear end being shown between two spaced apart horizontal guide bars between which it may slide back and forth; and the pressure liquid operated cylindrical motor by which the rear end of the hitch is raised or lowered, being shown supported by the rear face of the power liquid carrying tank, the plunger of such cylindrical motor being shown in substantially its central vertically movable position;

FIGURE 4 shows a bottom face view of the vehicle shown in FIGURES 1, 2 and 3; and this figure shows the form of the hitch unit, with its main tubular element extending from the front end of the vehicle to a position between the rear drive wheels, with the rear hitch bar pivotally connected to such rear portion of the tubular element, to permit lateral swing of such rear hitch bar through an angle of substantially thirty degrees to each side of the central axis of the vehicle;

FIGURE 5 shows the lower portion of the motor vehicle with a modified embodiment of the hitch connected thereto, the pressure liquid motor for such hitch being in substantially its central position, vertically; and this figure also shows a right-hand elevation of a lawn-mower connected to the front end of the hitch bar; such lawn-mower embodying pressure liquid motors for rotating the mower blades which rotate on laterally displaced vertical axes.

Referring to the drawings, FIGURES 1, 2, 3 and 4 show various views of the typical motor vehicle provided with one form of the hitch comprising a portion of the present invention. It is unnecessary to describe such vehicle in detail, as such detailed description is incorporated in Letters Patent, No. 3,250,340 of which the present application is a division. It will suffice to state that the hitch embodiments to be described are connected to and supported by the main frame of the vehicle unit, and that the traction forces are transmitted from the vehicle to the hitch through such connections. Other connections are provided between the hitch embodiments, and the vehicle frame, to produce and control vertical adjustments of the main hitch element.

The hitch embodiment shown in FIGURES 1, 2, 3 and 4, includes the forwardly extending bar 118 which underlies the front half of the vehicle frame and terminates somewhat in advance of the front end of the frame section 50 (see FIGURE 4). This bar 118 is pivotally connected to such vehicle frame section at or near the middle thereof, by the transversely extending axial pivot 119, best shown in FIGURES 1 and 4. To this end such pivot comprises a transversely extending bar substantially at the elevation of the vehicle frame, being the bar 120 having its ends journalled in the brackets 121 which extend down from the frame 50. The two brace bars 122 and 123 extend upwardly on a slant from the hitch bar 118 to such bar 120, as shown in FIGURE 2, being connected to the hitch bar 118 and to such bar 120 by welding or otherwise. I have also provided the supplemental brace bars 124 and 125 extending from the hitch bar at a point further forward than such pivotal connection, upwardly and laterally to meet the bar 120 near the brackets 121, so that horizontal components of force developed in the hitch bar will be properly transferred to the pivotal connection to the tractor frame.

It is now seen that such hitch bar 118 may swing forwardly and upwardly about the pivotal axis 119; but due to the fact that such hitch bar lies below the plane which includes the pivotal axis, the front end portion of the hitch bar must rise during forward shift of such hitch bar, with corresponding lowering of the rear portion of the hitch bar during such forward swing. During execution of such movements, however, such hitch bar is effectively retained against lateral shift to one side of the vehicle or the other side thereof.

Conveniently such hitch bar comprises a length of square or other rectangular tubing section, so that it has great stiffness. Such bar may also be carried down near its mid-point, and then again raised in its front portion, to avoid interference with the front axle element 58 and related parts. Connection of implements to the front end of such hitch bar is readily made by use of a male element set into the front end of such hitch bar and pinned thereto by a removable pin through suitable vertically aligned holes in the parts, or otherwise. In the showing of FIGURES 1, 2 and 4 I have indicated the short bar 126 set into the front end portion of the hitch bar, and provided with the vertical pin receiving hole 127, by which attachment may be made to the implement.

Further exploring this hitch bar embodiment it is seen that forward traction delivered to the hitch bar and transmitted to the implement would produce a rocking torque urging downward movement of the front end of the hitch bar, and corresponding downward thrust onto the attached implement. Conversely, a rearward pull developed by the vehicle would produce upward forces at the stated points. I have provided means constituting a portion of the vehicle itself for countering such so developed forces, and for even overpowering them to produce intended controls of the hitch independent of or contrary to such traction developed forces. Such supplemental means is as follows, referring to FIGURES 1, 3 and 4:

To the lower portions of the vehicle frame plates, specifically, the motor supporting plates, 95 and 96 (see FIGURE 4) there is pivotally connected a rockable frame which includes the crosswise extending, double and spaced apart or twin bar element 128 (see FIGURES 1, 3 and 4), between whose bars 129 and 130 there is established a horizontally extending slotted opening 131 (see FIGURE 3). The pivoting just referred to is produced by the two forwardly and slightly upwardly slanting bars 132 and 133 connected to the ends of such twin bar element, and joined together at their front ends by the crosswise extending bar element 134, the ends of such bar element 134 being upturned as shown in FIGURES 1 and 3, and pivotally connected to the motor plates above referred to. Such pivotal connections are shown at 135 in FIGURES 1 and 3.

A bracket 136 is secured to the central portion of the uppermost of the twin bars, 129, and extends upwardly and rearwardly as well shown in FIGURE 1. Thus the upper end of such bracket is brought to a location rearward of the back face of the frame element 72 (see FIGURES 1 and 3). A double acting hydraulic cylinder unit 137 is secured to such back face, for vertical movements of its plunger 138; and such plunger's piston rod 139 extends down to and is pivotally connected to the upper portion of such bracket 136, by a loose connection, if necessary, to allow for slight angularity imposed by the slight rocking movements of the bracket as it moves up and down. The upper and lower ends of such cylinder are connected by suitable tubes or conduits to the hydraulic system of the vehicle, for actuation by high pressure liquid as needed, and as controlled by the driver of the vehicle.

A traction bar 140 has its rear end pivotally connected at 141 to the cross bar 134 previously referred to, and extends rearwardly between the twin bars 129 and 130, and through the slotted opening 131 (see FIGURE 3), so that such bar may swing through a substantial angle to either side of the medial plane through the vehicle. One such swung position of such bar is shown by the dashed lines 140a in FIGURE 4. Several sets of vertically aligned holes 142 are provided through the twin bars 129 and 130, so that pins may be set down through such pairs of holes as selected, to retain the traction bar in its intended position of angle to the line of draft. When such traction bar is free of the hitch element bar 118, previously described, traction developed in such bar 140 will tend to rock it upwardly about the pivotal axis 135. Such tendency may be resisted by application of hydraulic force through the instrumentality of the cylinder and plunger unit. This is true whether such traction bar be aligned with the line of draft or not. It is evident that a trailing implement, such as a lawn-mower connected to the bar when such bar has been set over to one side, will nevertheless be drawn straight ahead as the vehicle progresses forwardly, so that such implement will function normally, but along a track or trace offset laterally from the path of the vehicle itself.

By tilting both the hitch car unit 118 and the front end portion of the bar 140 downwardly, their proximate ends will separate slightly so that the front end of the bar 140 may be set into the rear portion of the hitch unit 118, it being understood that such unit 118 is tubular in section. Then a pin may be dropped through aligned holes 142 of the two units (see FIGURE 4) to retain them in aligned engagement with each other. Under these conditions the following further relationships and functions are noted:

Thus connected together by a rather loose pin connection, hydraulic force in the cylinder 137 may raise the rear end of the bar 140, thus producing rock of the hitch unit 118 about its own transverse axis 119, with depression of the rear portion of such unit, and raising of its front portion 126 to which an implement may be connected. The extent of such movement may be controlled by proper control of the hydraulically produced movement. Also, by producing hydraulic lock of the parts in their thus adjusted position, such parts will be retained in such relation as long as the hydraulic lock is continued. Conversely, proper introduction of the high pressure liquid into the opposite end of the cylinder, with corresponding release of the liquid from the first used end of the cylinder, will produce reverse movements of the end portions of the hitch 118. It is thus evident that I have made provision for power raising or lowering of an implement connected to either the front end of the hitch, or to the rear end thereof.

In FIGURE 5 I have shown an alternative form of hitch and in such figure this hitch is shown connected to a power driven lawn-mower. Such lawn-mower will be described hereinafter. This alternative form of hitch includes the front traction transmitting bar 143 provided with a rigid upwardly extending lug 144 which is pivotally connected to the vehicle frame at 145. Accordingly shift of the rear end of such bar 143 forwardly or backwardly will result in rocking of the bar about such pivotal point as an axis. Thus, forward shift of the bar will result in raising of the front end of the bar and viceversa. I have also provided the bell-crank element 146 at the rear end portion of the vehicle frame, including the upstanding lug 147 rearward of the pivotal point 148 of such bell-crank, such pivotal point being located at the lower end of the downwardly extending lug 149 connected to the vehicle frame. Thus, up and down rocking movements of the bell-crank will produce forward and backward movements of such lug 147. Such bell-crank provides a rearwardly extending traction element to which implements may be connected; and conveniently such bar 146 is raised and lowered by the hydraulically operated plunger 138ª working in the cylinder 137ª and connected to the bar 146 by the link 139ª and the twin bars 128ª and 129ª similar to the arrangements previously described and shown in FIGURES 3 and 4, for raising and lowering the traction bar 140.

The link 151 is pivotally connected to the lug 144 at the point 152, and is pivotally connected to the lug 147 at the point 153. Accordingly, the raising and lowering of the rear traction bar 146 by hydraulic means also produces forward and backward shift of the traction bar 143, respectively. It is also emphasized that such forward and backward shifts of such tractor bar are accompanied by corresponding raisings and lowerings of the rear end of such traction bar.

In FIGURE 5 I have also shown by dashed lines the rearward extension 154 of the tractor bar 143. Any desired and suitable implement may be attached to such rearward extension, with such implement beneath the central portion of the vehicle. Such an implement may be, for example, a lawn-mower, as will be hereinafter described.

It is noted that in both of the hitch embodiments of FIGURES 1 and 5, the forces of traction, either pull or push, come to the motor plates of the vehicle, 95 and 96 (see FIGURES 2 and 4), and through them, to the motor shafts of the wheel drive motors of the vehicle, through direct force transmitting elements. Thus, in the embodiment of FIGURE 1 the bar 140 is connected at the pivotal points 135 to the motor plates 95 and 96; in the embodiment of FIGURE 5 the lug 149 is connected to the lower part of the frame element 72 which is also connected to such motor plates through the plates 91, 92, 93 and 94 (see FIGURE 4). Thus in both such embodiments the forces of traction are delivered to the motor plates (and thus to the drive wheel supporting shafts) by direct, strong, non-yielding connections, for best transmission of traction forces from the drive wheels to such hitch elements.

There may be attached to the hitch bar of either of the alternative embodiments of hitch disclosed herein, such implements as may be desired, requiring power supply within the capacity of the power available for such purpose. Such power requirements for the implements include drives of elements local to the implements, for continuous operation of implement functions (e.g., cutter operations of lawn-mowers), directional operational changes (e.g., the direction of delivery of removed snow), which power requirements are transitory, and others. The means for producing and delivering such ancillary power requirements comprise a portion of the disclosures of the parent application, from which the present application is divided.

I claim:

1. A motor vehicle for delivering traction to an implement; such motor vehicle including a frame, a front hitch element extending longitudinally of the frame beneath said frame; means to support said front hitch element to the frame comprising a horizontal transverse axial pivotal connection between said hitch element and the frame, said pivotal connection being located proximate to the central portion of the frame from front to rear and the plane which includes said front hitch element being below the frame and the transverse axial pivotal connection being above said plane; and power means to rock said front hitch element on said pivotal connection, comprising means to apply force to the rear end portion of the hitch at a level lower than said transverse pivotal connection, wherein the means to rock the front hitch element on said pivotal connection comprises a rearward extension of said hitch element beyond the pivotal connection, together with means to apply force vertically to said rearward extension; wherein the means to apply force vertically to the rearward extension comprises a rear hitch element beneath the rear portion of the frame, a horizontal transverse pivotal connection between said rear hitch element and the frame, the rear hitch element extending forwardly beyond such rear hitch element pivotal connection to the frame, to a location proximate to the rearward extension of the front hitch element, vertical force transmitting connections between the forward portion of the rear hitch element and the rear end portion of the rearward extension of the front hitch element, and means to shift the rear portion of the rear hitch element vertically.

2. Means as defined in claim 1; wherein the means to shift the rear portion of the rear hitch element vertically comprises a hydraulic motor unit.

3. Means as defined in claim 2; wherein said hydraulic motor unit comprises a hydraulic cylinder and a plunger reciprocally mounted therein, means to connect the cylinder to the frame, and a connection between the plunger and the rear portion of the rear hitch element.

4. Means as defined in claim 3; wherein the rear hitch element includes a rearward extension, and a vertical pivotal connection between said rearward extension and the forwardly extending portion of the rear hitch element.

5. Means as defined in claim 1; wherein the means to rock the front hitch element on said pivotal connection comprises means to exert a vertical force to the rear portion of the rear hitch element.

6. Means as defined in claim 5; wherein said vertical force exerting means comprises a vertically movable link element, and power means to shift said link element vertically.

7. Means as defined in claim 6; wherein said power means comprises a hydraulic cylinder, means to connect said cylinder to the vehicle frame, a plunger working in the cylinder, and operative connections between the plunger and the link element.

8. Means as defined in claim 7; wherein the operative connections between the plunger and the link element include a bell-crank element.

References Cited
UNITED STATES PATENTS

| | | | |
|---|---|---|---|
| 1,663,140 | 3/1928 | Remde | 280—479 |
| 2,496,474 | 2/1950 | Hyman | 280—479 |
| 2,753,191 | 7/1956 | Smith | 280—499 X |

FOREIGN PATENTS

| | | |
|---|---|---|
| 903,417 | 7/1955 | Germany. |

LEO FRIAGLIA, *Primary Examiner.*